Oct. 23, 1923.
H. R. WALLACE
CANDY COATING MACHINE
Filed March 18, 1921
1,471,429
3 Sheets-Sheet 1
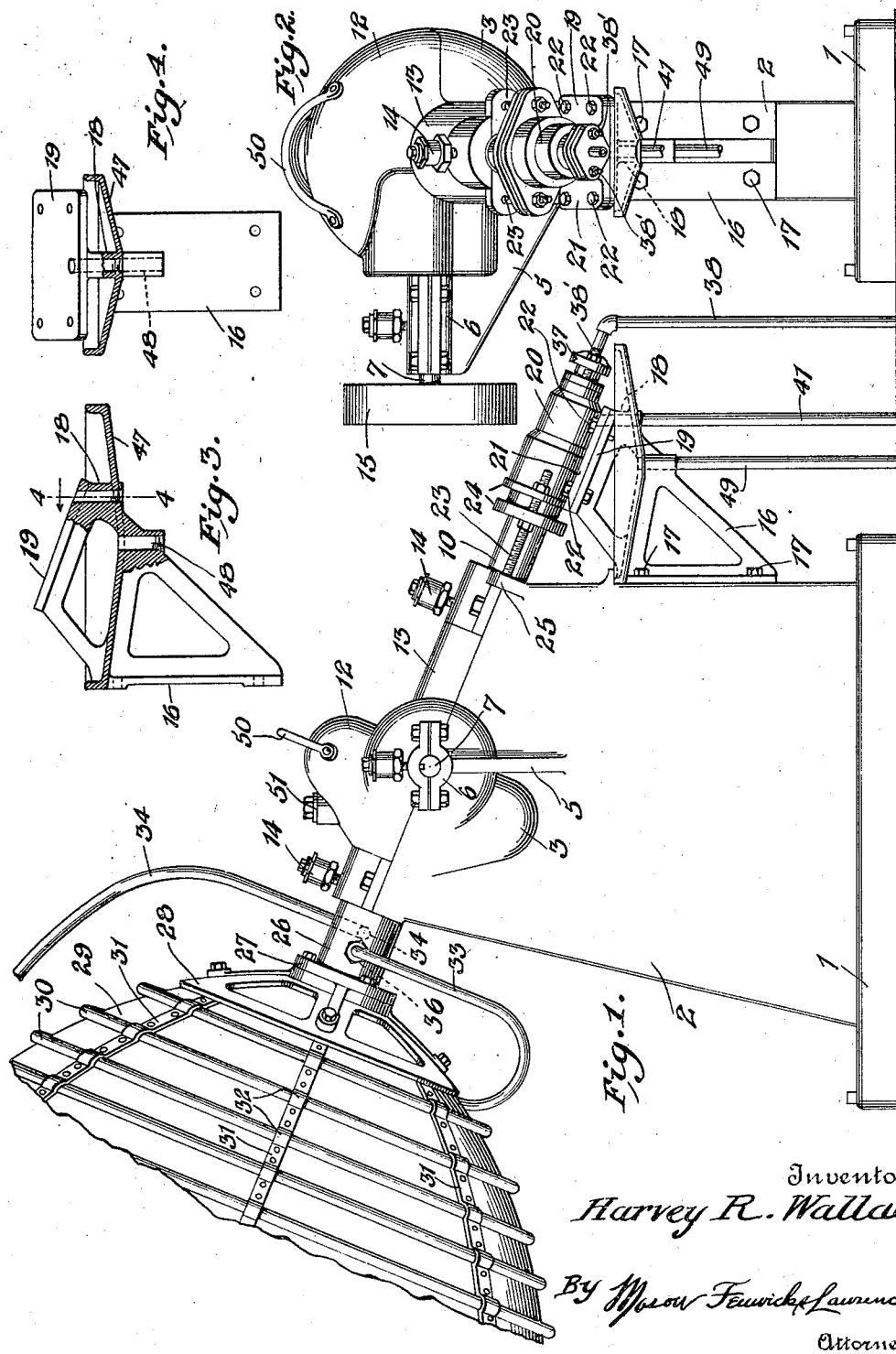
Inventor
Harvey R. Wallace
By Mason Fenwick & Lawrence
Attorneys

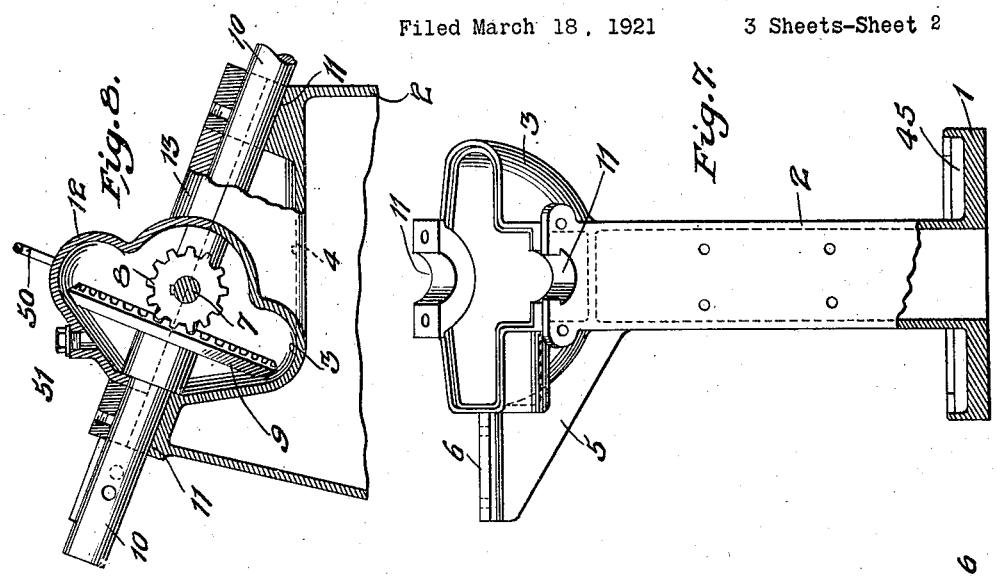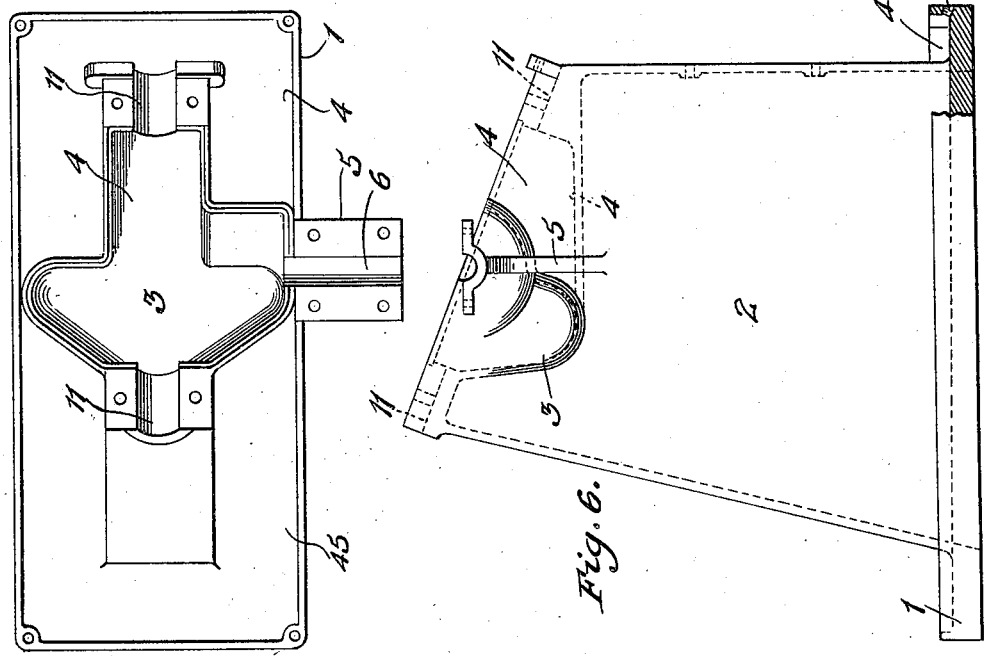

Oct. 23, 1923. 1,471,429
H. R. WALLACE
CANDY COATING MACHINE
Filed March 18, 1921 3 Sheets-Sheet 3
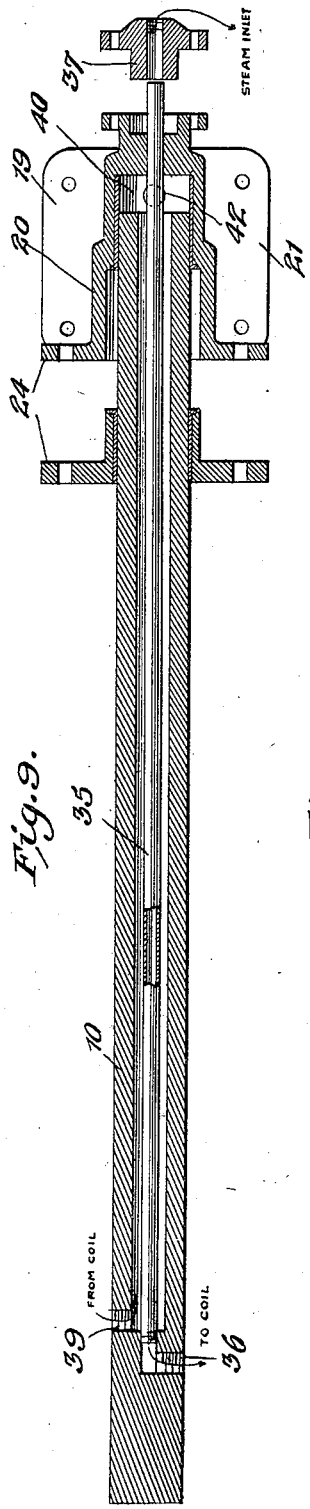
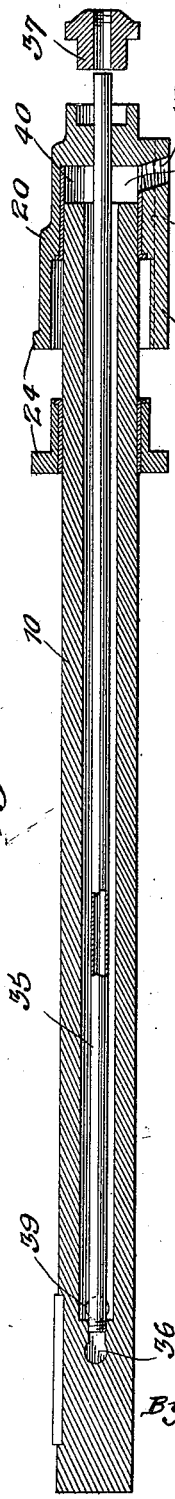
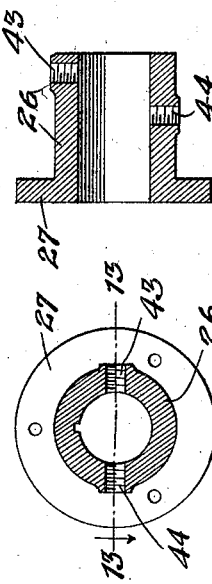
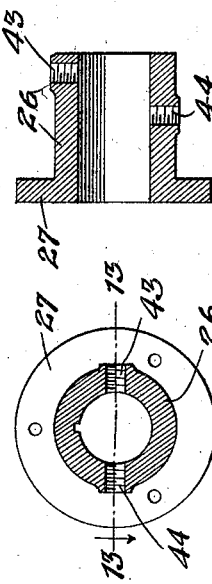
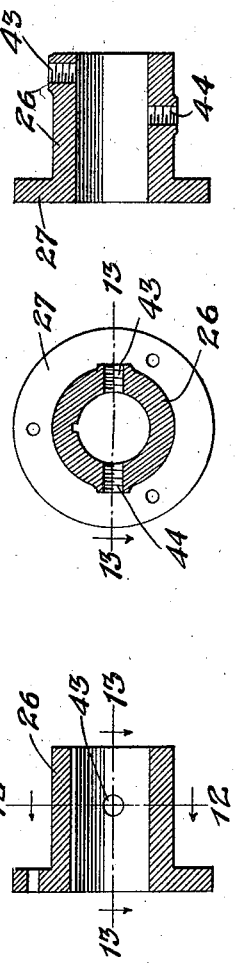
Inventor
Harvey R. Wallace
By Mason Fenwick & Lawrence
Attorneys Patented Oct. 23, 1923.

1,471,429

UNITED STATES PATENT OFFICE.

HARVEY RAY WALLACE, OF BROOKLYN, NEW YORK, ASSIGNOR TO LOFT INCORPORATED, OF NEW YORK, N. Y.

CANDY-COATING MACHINE.

Application filed March 18, 1921. Serial No. 453,524.

*To all whom it may concern:*

Be it known that I, HARVEY R. WALLACE, citizen of the United States, residing at Brooklyn, in the county of Kings and State of New York, have invented certain new and useful Improvements in Candy-Coating Machines; and I do hereby declare the following to be a full, clear, and exact description of the invention, such as will enable others skilled in the art to which it appertains to make and use the same.

This invention relates to new and useful improvements in coating machines and more particularly to a candy coating machine. The main object of this invention is the provision of a machine particularly adapted for sugar coating fillers for candy, such as almonds, peanuts or the like, wherein the sugar and the filler is placed in a revolving vat, said vat being heated through the medium of steam pipes attached thereto whereby to soften the sugar so that it will readily adhere to the fillers and form sugar coated candy.

Another object of the invention is the provision of a coating machine of the above character, having a substantially strong base member upon which the operating gears are mounted, said gears being enclosed within a suitable housing which is particularly adapted for the reception of lubricants in which the operating gears rotate to provide for a thorough lubrication of the parts and in view of the fact that the lubricant and gears are entirely enclosed, it will prevent the operator from coming in contact with the lubricant.

A further object of the invention is the provision of a sugar coating machine wherein the operating parts are rigidly supported upon a base, said base being provided with an auxiliary supporting bracket for the purpose of rigidly supporting a stuffing box in its proper position to retain the same in perfect alignment with the main driving shaft of the machine.

With the above and other objects in view, the invention consists in the novel features of construction, the combination and arrangement of parts hereinafter more fully set forth, pointed out in the claims and shown in the accompanying drawings, in which—

Figure 1 is a side elevation of a sugar coating machine, constructed in accordance with my invention, Figure 2 is a rear perspective view, Figure 3 is a side elevation of the bracket secured to the base member for supporting the box, parts thereof being broken away and illustrated in cross-section, Figure 4 is a transverse sectional view, taken on the line 4—4 of Figure 3, Figure 5 is a top plan view of the base member, illustrating the lubricant receptacle, Figure 6 is a side elevation of the base member, parts thereof being broken away and illustrated in section, Figure 7 is a rear elevation of the base member, parts thereof being broken away and illustrated in section, Figure 8 is a longitudinal sectional view, taken through the upper portion of the base member, showing the operating shaft and gears in position, Figure 9 is a longitudinal sectional view, taken through the operating shaft, showing the manner of supplying steam to the coil of the heating vat, Figure 10 is a similar view, taken at right angles to the showing in Figure 9, Figure 11 is a longitudinal sectional view of the member which provides for connection between the steam inlet and outlet pipes and the coils surrounding the vat, Figure 12 is a transverse sectional view, taken on the line 12—12 of Figure 11, and Figure 13 is a longitudinal sectional view, taken on the line 13—13 of Figure 11.

In the construction of my candy coating machine, I prefer to provide a rigid base member 1, having arranged centrally thereof an upstanding casing 2, to support the operating mechanism of my improved candy coating machine. The upper end of the casing 2 is provided with a transverse pocket 3 and a longitudinal pocket 4 opening into one another for the specific purpose of containing lubricant for the lubrication of the driving mechanism which is arranged within these pockets. Secured to the upper end of the casing 2 is a bracket 5 supporting a shaft bearing 6 in which the drive shaft 7 is mounted.

Mounted upon the inner end of the shaft 7 is a pinion 8 adapted to mesh with a bevel gear 9, mounted upon the main driving shaft 10. This shaft 10 is mounted for rotation within suitable bearings 11, preferably disposed at each end of the casing 2 at the top thereof and disposed at an angle of approximately 45°.

In order to prevent dirt and particles of waste from entering the lubricant receptacles 3 and 4, a suitable cover 12 is provided, which includes an enlarged arcuate portion whereby to provide for free movement of the gear 9 within the cover and a longitudinal portion 13 which is preferably adapted for enclosing that portion of the shaft 10 which is mounted within the upper end of the standard 2. The end portions of this closure are provided with oil cups 14 for the purpose of lubricating the bearings 11. The outer end of the shaft 7 is provided with a driving wheel 15, adapted to be connected by means of a belt or other similar device to a source of motive power for driving the shaft 7 to impart movement to the gears 8 and 9 and the shaft 10.

Secured to the casing 2 at the rear end thereof is a supporting bracket 16, which is bolted or otherwise secured to the casing 2, as shown at 17. This bracket is provided with a central standard 18 having secured to its upper end a bearing plate 19, upon which the stuffing box 20 is mounted. This stuffing box 20 is provided with a base plate 21, preferably of the same size as the plate 19 and mounted upon the plate 19. These two plates are connected together by bolting, or otherwise securing, the same as shown at 22.

The stuffing box 20 is preferably adapted for enclosing the lower end of the shaft 10 and is secured to the casing 2 at its upper end by means of the screw bolts 23, which are connected to the stuffing box through the medium of the plates 24, the ends of said screws being engaged with the threaded ears 25 formed upon the casing 2, upon opposite sides of the lower shaft bearing 11. From this, it will be apparent that the stuffing box 20 can be readily adjusted through the medium of the screws 23 to retain the same in a proper alignment with the shaft 10. Keyed to the upper end of the shaft 10 is a sleeve 26, having an annular flange 27 and secured to this annular flange 27 is a concave supporting bracket 28 in which is mounted the cylindrical vat 29, which is adapted to receive the sugar and fillers for the purpose of coating. In order to heat the vat 29, a series of coils 30 is arranged upon the exterior of the vat and supported in position by means of the plates 31, having sleeves 32 formed therein for the purpose of supporting the coils 30 in a circumferential position around the vat 29. The lowermost coil is connected to an inlet pipe 33, while the uppermost coil is connected to an outlet pipe 34 for the purpose of providing a continual supply of steam to the coils 30 for heating the contents of the vat 29.

In order to provide for a sufficient supply of steam to the coils 30, the shaft 10, as illustrated in Figure 9, is preferably of hollow formation and centrally arranged within the shaft for a conducting pipe 35, said pipe having its inner end threaded into one end of a T-shaped opening 36 into which the end of the pipe 33 is engaged, thus forming direct communication between the pipe 35 and the pipe 33. The other end of the pipe 35 is extended through the stuffing box 20 and retained in position by means of the cap member 37, which is held in place with respect to the stuffing box by means of the bolts 38. The outer end of the pipe 35 is connected to a feed pipe 38 which in turn may be connected to any source of supply for the steam.

After the steam has entered the coil through the conducting pipe 35 and passed around the body member 29, it returns to the bore within the shaft 10 through the pipe 34. This pipe 34 is threaded into a suitable opening 39 at one side of the shaft preferably at a point adjacent the opening 36 and the returning steam passes through the bore of the shaft 10 around the pipe 35 to the cavity 40 in the stuffing box 20, said cavity having connected therewith an outlet or exhaust pipe 41, the end of which is threaded into the opening 42 formed in the stuffing box, whereby to provide communication between the cavity 40 and the exhaust pipe 41. From this, it will be apparent that a continuous circulation of live steam is provided for around the vat 29 through the coils 30. It will be noted from the illustrations given in Figures 11, 12 and 13 that the sleeve 26 is provided with the oppositely disposed openings 43 and 44 for the purpose of registering with the openings 36 and 39 in the shaft 10 to provide for direct communication between the inlet and outlet openings in the shaft 10 and the pipes 33 and 34.

In the general construction of machines of this type, the mechanism or operating parts have been entirely exposed and arranged in such a manner that it is necessary to continuously lubricate the parts, particularly the gears and in order to provide for suitable lubrication for these gears, I have constructed the device with an enclosed standard 2, having formed in its upper end the cavities 3 and 4 for the purpose of containing suitable lubricant for the gears 8 and 9. It will be noted that when the lubricant is placed within these cavities, the gear 9 is at all times engaged with the lubricant and should any of the lubricant escape through the shaft bearings or the like, it will be caught in the trough 45 which is formed in the base member 1 and adapted to extend around the standard 2. This trough is provided with an outlet 46 beneath which a suitable receiving receptacle can be placed for catching any of the waste lubricant which might escape from the cavities 3 and 4.

In order to receive the escaping lubricant from the stuffing box 20, a receptacle 47 is arranged around a portion of the bracket member 16 and disposed directly beneath the stuffing box. This receptacle 47 is of a size suitable to catch all the drippings of lubricant from the stuffing box 20 and is provided with an outlet 48 having connected therewith a drain pipe 49, whereby the superfluous lubricant can be conveyed to any suitable receiving receptacle. It will also be noted that the cover member 12 is provided with a handle 50, whereby this cover can be readily removed when it is desired to gain access to the interior of the cavities 3 and 4 and the housing is also provided with an opening normally closed by means of the cap member 51, whereby lubricant can be placed within the housing without removing the cover.

What I claim is:

1. A machine of the class described, including a base member, a standard in the form of a casing rising therefrom, a bracket attached to said casing and projecting outwardly therefrom and a receiving receptacle carried by said bracket, as and for the purpose set forth.

2. A machine of the class described, including a base member, a standard in the form of a casing rising therefrom, a bracket attached to one side of the standard, a bearing plate carried by said bracket having a receiving receptacle carried by the bracket and arranged beneath the bearing plate, said receptacle being substantially larger than the bearing plate.

3. A machine of the class described, including a base member, a standard in the form of a casing rising therefrom, a bracket attached to said standard, a bearing plate carried by the bracket, a stuffing box mounted upon the plate and adjustable connection between the standard and the stuffing box, as and for the purpose set forth.

In testimony whereof I affix my signature.

HARVEY RAY WALLACE.